(12) United States Patent
Hirano et al.

(10) Patent No.: US 9,619,700 B2
(45) Date of Patent: Apr. 11, 2017

(54) IMAGE PROCESSING DEVICE, IMAGE PROCESSING METHOD, PROGRAM, AND INFORMATION STORAGE MEDIUM

(71) Applicant: Rakuten, Inc., Tokyo (JP)

(72) Inventors: Hiromi Hirano, Tokyo (JP); Makoto Okabe, Tokyo (JP)

(73) Assignee: RAKUTEN, INC., Tokyo (JP)

(*) Notice: Subject to any disclaimer, the term of this patent is extended or adjusted under 35 U.S.C. 154(b) by 0 days.

(21) Appl. No.: 14/423,437

(22) PCT Filed: May 30, 2013

(86) PCT No.: PCT/JP2013/065115
§ 371 (c)(1),
(2) Date: Feb. 24, 2015

(87) PCT Pub. No.: WO2014/030406
PCT Pub. Date: Feb. 27, 2014

(65) Prior Publication Data
US 2015/0213312 A1 Jul. 30, 2015

(30) Foreign Application Priority Data
Aug. 24, 2012 (JP) .................................. 2012-184906

(51) Int. Cl.
*G06K 9/00* (2006.01)
*H04N 1/40* (2006.01)
(Continued)

(52) U.S. Cl.
CPC ..... *G06K 9/00442* (2013.01); *G06K 9/00456* (2013.01); *G06K 9/325* (2013.01);
(Continued)

(58) Field of Classification Search
CPC ........... H04N 1/40062; G06K 9/00456; G06K 9/325; G06K 9/4604; G06K 9/4652; G06K 9/3241; G06K 9/00442; G06K 2209/01
See application file for complete search history.

(56) References Cited

U.S. PATENT DOCUMENTS

| 2006/0045346 A1* | 3/2006 | Zhou | G06K 9/3266 |
| | | | 382/190 |
| 2007/0285722 A1* | 12/2007 | Koyama | G06K 9/00456 |
| | | | 358/1.18 |

(Continued)

FOREIGN PATENT DOCUMENTS

| JP | 2009-043265 A | 2/2009 |
| JP | 2010-225112 A | 10/2010 |

OTHER PUBLICATIONS

English translation of JP 2009-043265.*
International Search Report for PCT/JP2013/065115 dated Jul. 30, 2013.

*Primary Examiner* — Li Liu
(74) *Attorney, Agent, or Firm* — Hubbs, Enatsky & Inoue PLLC (57) ABSTRACT

Provided is an image processing device capable of specifying a character area included in an image even if a variable-density difference in an area included in the image other than the character area is large. A feature point specifying unit specifies corners of edges in a target image as feature points. An area obtaining unit obtains, based on a specified result of the feature point specifying unit, an area including a plurality of feature points aligned in a substantially straight line. A character area specifying unit specifies a character area in the target image based on the area obtained by the area obtaining unit.

6 Claims, 9 Drawing Sheets

(51) Int. Cl.
*G06K 9/46* (2006.01)
*G06K 9/32* (2006.01)

(52) U.S. Cl.
CPC ......... *G06K 9/3241* (2013.01); *G06K 9/4604* (2013.01); *G06K 9/4652* (2013.01); *H04N 1/40062* (2013.01); *G06K 2209/01* (2013.01)

(56) References Cited

U.S. PATENT DOCUMENTS

| | | | | |
|---|---|---|---|---|
| 2009/0034848 | A1* | 2/2009 | Sakamoto | G06K 9/3283 382/195 |
| 2011/0228124 | A1* | 9/2011 | Ahn | G06K 9/3283 348/222.1 |
| 2013/0148896 | A1* | 6/2013 | Ihara | G06K 9/00442 382/195 |
| 2013/0182909 | A1* | 7/2013 | Rodriguez-Serrano | G06K 9/34 382/105 |
| 2013/0322758 | A1* | 12/2013 | Matsushita | G06K 9/18 382/182 |

* cited by examiner

IMAGE PROCESSING DEVICE, IMAGE PROCESSING METHOD, PROGRAM, AND INFORMATION STORAGE MEDIUM

CROSS REFERENCE TO RELATED APPLICATIONS

This application is a National Stage of International Application No. PCT/JP2013/065115 filed May 30, 2013, claiming priority based on Japanese Patent Application No. 2012-184906 filed on Aug. 24, 2012. The contents of each of the above documents are incorporated herein by reference in their entirety.

TECHNICAL FIELD

The present invention relates to an image processing device, an image processing method, a program, and an information storage medium.

BACKGROUND ART

In a field of image processing, there is a case where one might want to determine whether an image includes a character area inserted by an image editing, or specify (detect) all character areas inserted by the image editing in the image.

For example, in a case of a virtual mall site, one might want to extract an item image (a product image) that does not have text such as "free shipping", "Grand Prize Winner" or the like from item images of shops in the virtual mall, and use the item image on a top page or the like. In this case, it is necessary to determine whether the item image includes the character area inserted by the image editing.

Further, in the virtual mall site, one might want to check whether text that is illegal under the Pharmaceutical Affairs Law or the like, for example, is written on an item image. In this case, it is necessary to specify every character area inserted by the image editing from the image.

As a technology to specify a character area included in an image, the technology disclosed in Patent Literature 1 is known, for example. Patent Literature 1 discloses technology for specifying a character area of advertisement leaflets in which characters and images are laid out (see paragraphs 0019 and 0020, and FIG. 3). In the technology disclosed in Patent Literature 1, image data is separated for each color, and a plurality of pieces of color image data is thereby generated. Further, an edge part is specified using the variable density of image data, and an area that only includes amount of edges less than a predetermined value is specified as a photograph area. A character area is then specified for each piece of color image data based on the photograph area.

CITATION LIST

Patent Literature

Patent Literature 1: JP2010-225112A

SUMMARY OF INVENTION

Technical Problem

In a case where a variable-density difference in a photograph area included in an image is larger, the amount of edges of the photograph area becomes larger. In Patent Literature 1, an area that only includes the amount of edges less than the predetermined value is specified as the photograph area. As such, when a variable-density difference in the photograph area is large, the photograph area is not specified accurately, and the character area may not be specified.

One or more embodiments of the present invention have been conceived in view of the above, and an object thereof is to provide an image processing device, an image processing method, a program, and an information storage medium capable of specifying a character area included in an image even when a variable-density difference in an area included in the image other than the character area is large.

Solution to Problem

In order to solve the above described problems, an image processing device according to the present invention includes feature point specifying means for specifying corners of edges in a target image as feature points, area obtaining means for obtaining an area based on a specified result of the feature point specifying means, the area including a plurality of feature points aligned in a substantially straight line, and character area specifying means for specifying a character area in the target image based on the area obtained by the area obtaining means.

An image processing method according to the present invention includes a feature point specifying step of specifying corners of edges in a target image as feature points, an area obtaining step of obtaining an area based on a specified result of the feature point specifying step, the area including a plurality of feature points aligned in a substantially straight line, and a character area specifying step of specifying a character area in the target image based on the area obtained in the area obtaining step.

A program according to the present invention is a program for causing a computer to function as feature point specifying means for specifying corners of edges in a target image as feature points, area obtaining means for obtaining an area based on a specified result of the feature point specifying means, the area including a plurality of feature points aligned in a substantially straight line, and character area specifying means for specifying a character area in the target image based on the area obtained by the area obtaining means.

A computer-readable information storage medium according to the present invention is a computer-readable information storage medium storing the program as described.

In an embodiment of the present invention, the character area specifying means may specify the character area based on areas that are close to each other among areas obtained by the area obtaining means.

In an embodiment of the present invention, the area obtaining means may obtain an area including a plurality of feature points that are aligned in a substantially straight line and have a same or similar color.

In an embodiment of the present invention, the character area specifying means may specify the character area by combining areas that are close to each other among areas obtained by the area obtaining means. In a case where a first area and a second area, which are obtained by the area obtaining means, are close to each other, the character area specifying means may specify the character area by combining the first area and the second area even when a color of a feature point included in the first area is neither a same as nor similar to a color of a feature point included in the second area.

In an embodiment of the present invention, the feature point specifying means may include first specifying means for specifying corners of edges in the target image as first feature points, and second specifying means for specifying corners of edges in a reduced image, which is obtained by reducing the target image, as second feature points. The area obtaining means may include first obtaining means for obtaining an area based on a specified result of the first specifying means, the area including a plurality of first feature points aligned in a substantially straight line, and second obtaining means for obtaining an area based on a specified result of the second specifying means, the area including a plurality of second feature points aligned in a substantially straight line. The character area specifying means may specify the character area in the target image based on the area obtained by the first obtaining means and the area obtained by the second obtaining means. The specification by the second specifying means and the obtainment by the second obtaining means may be repeated while the reduced image is gradually reduced. In other words, the specification by the second specifying means and the obtainment by the second obtaining means may be repeated until the reduced image is reduced enough.

In an embodiment of the present invention, the character area specifying means may include extracting means for extracting, using a graph cut method, an area included in the character area among from areas obtained by the area obtaining means, and means for specifying the character area in the target image based on the area extracted by the extracting means.

Advantageous Effects of Invention

According to the present invention, it is possible to specify a character area included in an image even when a variable-density difference in an area included in the image other than the character area is large. Further, according to the present invention, it is possible to prevent an area having a large variable-density difference in an image including no character from being specified in error as a character area. In other words, even when an image including no character has a large variable-density difference, it is possible to determine that a character is not included in the image.

DESCRIPTION OF EMBODIMENTS

An example of an embodiment of the present invention will be described below in detail with reference to the accompanying drawings.

Figure 1:
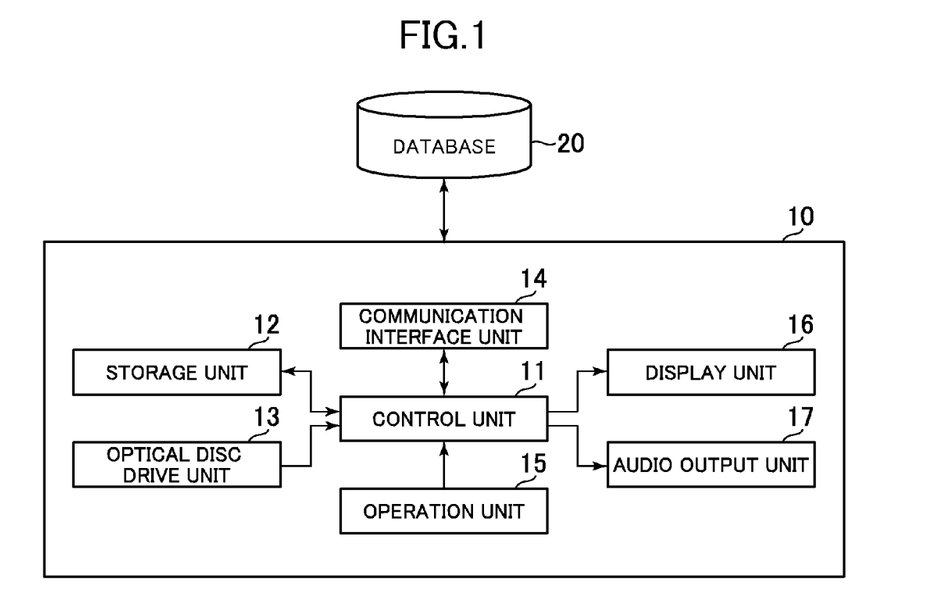
FIG. 1 A diagram illustrating an example of a hardware configuration of an image processing device according to an embodiment of the present invention.

FIG. 1 shows an example of a hardware configuration of an image processing device 10 according to an embodiment of the present invention. The image processing device 10 is implemented by, for example, a server computer, a desktop computer, a laptop computer, a tablet computer, or the like.

As shown in FIG. 1, the image processing device 10 includes a control unit 11, a storage unit 12, an optical disc drive unit 13, a communication interface unit 14, an operation unit 15, a display unit 16, and an audio output unit 17.

The control unit 11 includes, for example, one or more microprocessors, and executes information processing according to an operating system or a program stored in the storage unit 12. The storage unit 12 includes, for example, a RAM, a hard disk, and a solid-state drive. The optical disc drive unit 13 reads a program and data stored in an optical disc (information storage medium).

The program and the data are provided to the storage unit 12 through the optical disc. That is, the program and the data are read from the optical disc by the optical disc drive unit 13, and stored in the storage unit 12. The image processing device 10 may include a component for reading a program and data stored in an information storage medium other than the optical disc (e.g., memory card). The program and the data may be provided to the storage unit 12 through an information storage medium other than the optical disc.

The communication interface unit 14 is an interface for connecting the image processing device 10 with a communication network. The image processing device 10 can exchange data with other devices through the communication network. The program and the data may be provided to the storage unit 12 through the communication network.

The operation unit 15 is used for operation of the user. For example, a keyboard, a mouse, a touchpad, a touch panel, a stick (lever) or the like corresponds to the operation unit 15. For example, the display unit 16 is a liquid crystal display, an organic EL display or the like, and the audio output unit 17 is speakers, headphones or the like.

The image processing device 10 can access a database 20. The database 20 may be implemented in a device other than the image processing device 10 (e.g., server), or implemented in the image processing device 10.

The database 20 stores images. For example, the database 20 stores an item image, which is used in a virtual mall site provided by a web server (not shown). That is, the database 20 stores the item image prepared by staff of the shop in the virtual mall. For example, the database 20 stores the item image that is a photograph image of the item with text such as "free shipping", "Grand Prize Winner" or the like written thereon by the staff of the shop.

Figure 2:
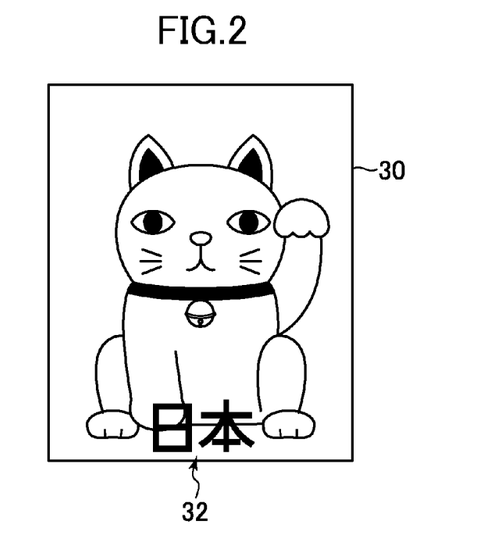
FIG. 2 A diagram illustrating an example of an item image.

FIG. 2 shows an example of an item image stored in the database 20. The item image 30 shown in FIG. 2 indicates a photograph image of an item (beckoning cat) with text 32 (character string) of kanjis (Chinese characters used in Japanese) meaning "Japan." Typically, it is often the case that an item image 30 like this has the text 32 written thereon in an eye-catching color that is different from colors of the item. In many cases, the text 32 is written in a single color and aligned in longitudinal, lateral, or oblique direction.

In the following, technologies are described for specifying an area (character area), in which the text 32 is written by image editing, from the item image 30 shown in FIG. 2.

Figure 3:
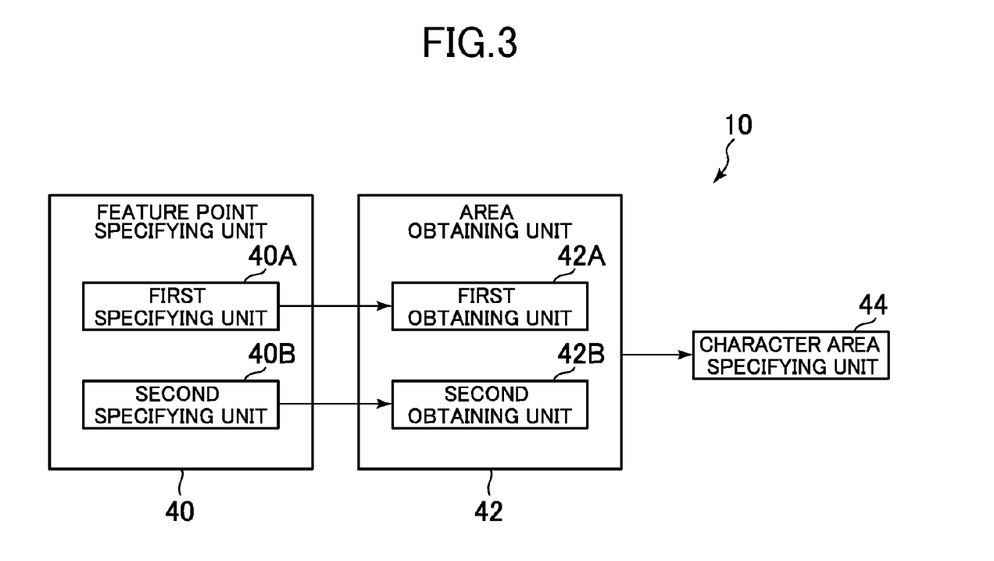
FIG. 3 A functional block diagram illustrating an example of functions implemented in the image processing device.

FIG. 3 is a functional block diagram illustrating functional blocks related to the present invention out of those implemented by the image processing device 10. As shown in FIG. 3, the image processing device 10 includes a feature point specifying unit 40, an area obtaining unit 42, and a character area specifying unit 44. The functional blocks shown in FIG. 3 are implemented by the control unit 11 of the image processing device 10.

The feature point specifying unit 40 specifies corners of edges of the target image as the feature points. Here, "corners of edges" are intersections of the edges in the target image.

The feature point specifying unit 40 includes a first specifying unit 40A and a second specifying unit 40B. The first specifying unit 40A specifies the corners of the edges in the target image as first feature points. The second specifying unit 40B specifies corners of edges in a reduced image, which is obtained by reducing the target image, as second feature points.

Functions of the feature point specifying unit 40, the first specifying unit 40A, and the second specifying unit 40B are described in detail later (see step S103 of FIG. 4 described below).

An area obtaining unit 42 obtains an area that includes feature points aligned in a substantially straight line based on the specified result of the feature point specifying unit 40.

The area obtaining unit 42 includes a first obtaining unit 42A and a second obtaining unit 42B. The first obtaining unit 42A obtains an area that includes first feature points aligned in a substantially straight line based on the specified result of the first specifying unit 40A. The second obtaining unit 42B obtains an area that includes second feature points aligned in a substantially straight line based on the specified result of the second specifying unit 40B.

Functions of the area obtaining unit 42, the first obtaining unit 42A, and the second obtaining unit 42B are described in detail later (see step S104 of FIG. 4 described below).

The character area specifying unit 44 specifies a character area in the target image based on the area obtained by the area obtaining unit 42. For example, the character area specifying unit 44 specifies the character area in the target image based on the area obtained by the first obtaining unit 42A and the area obtained by the second obtaining unit 42B.

More specifically, the character area specifying unit 44 specifies the character area in the target image based on the areas that are close to each other among those obtained by the area obtaining unit 42 (first obtaining unit 42A and second obtaining unit 42B).

For example, the character area specifying unit 44 specifies the character area in the target image by combining the areas that are close to each other among those obtained by the area obtaining unit 42 (first obtaining unit 42A and second obtaining unit 42B).

Functions of the character area specifying unit 44 are described in detail later (see steps S105, S106, and S111 of FIG. 4 described below).

Figure 4:
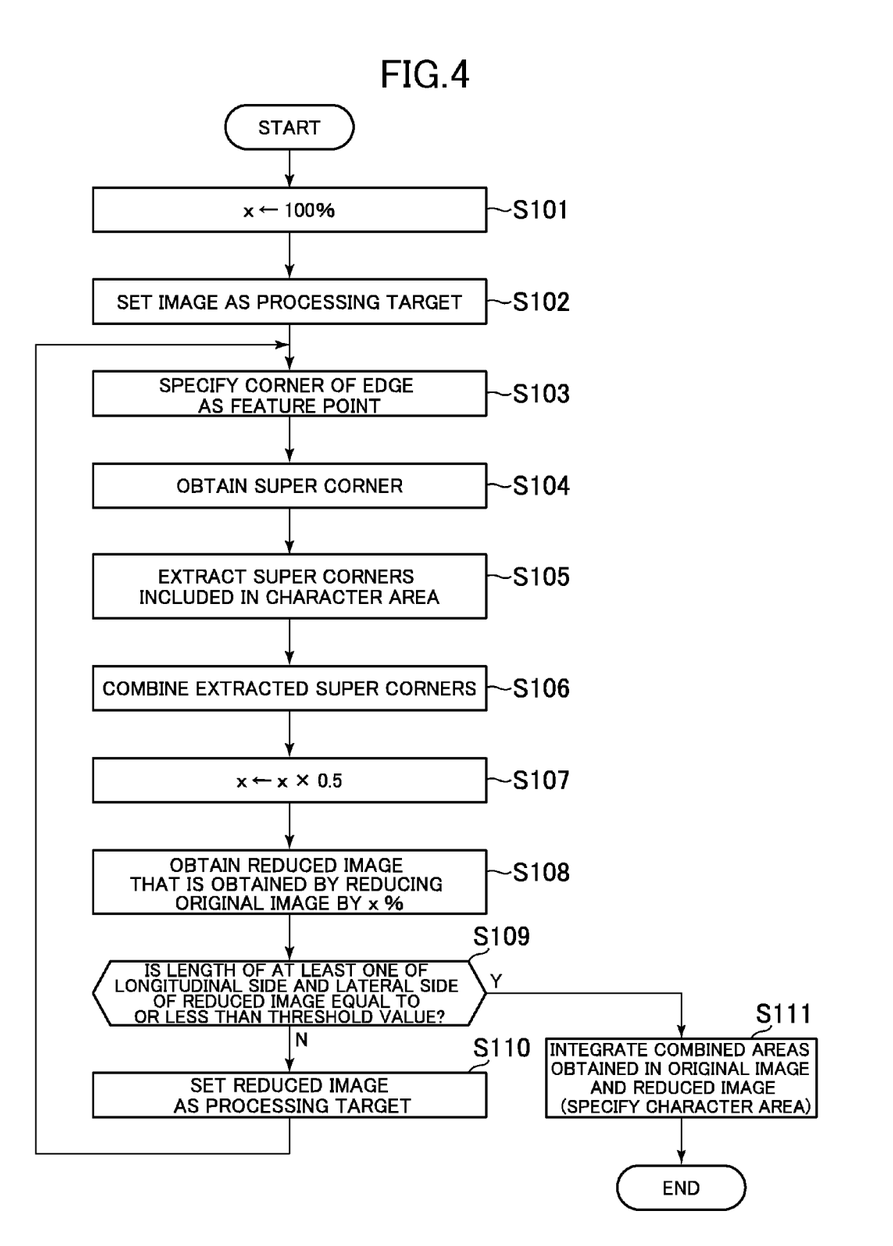
FIG. 4 A diagram illustrating an example of processing executed in the image processing device.

FIG. 4 is a flow chart illustrating an example of processing executed by the image processing device 10 so as to implement the feature point specifying unit 40, the area obtaining unit 42, and the character area specifying unit 44. The control unit 11 executes the processing shown in FIG. 4 according to a program, so that the control unit 11 functions as the feature point specifying unit 40, the area obtaining unit 42, and the character area specifying unit 44.

Further description of the feature point specifying unit 40, the area obtaining unit 42, and the character area specifying unit 44 are given below in reference to FIG. 4.

As shown in FIG. 4, firstly, the control unit 11 initializes a variable x to a 100% value (S101). The variable x is used insteps S107 and S108 described later.

The control unit 11 obtains an image (e.g., item image 30) from the database 20, and sets the image as a processing target (S102).

Subsequently, the control unit 11 (feature point specifying unit 40 and first specifying unit 40A) specifies corners of edges in the processing target image as feature points (S103). That is, the control unit 11 specifies intersections of the variable-density edges as the feature points.

As a method for specifying the feature point (corner), a known method is used. For example, FAST (Features from Accelerated Segment Test) is used. In the following, a case is explained where the FAST method is used, although a method other than the FAST method may be used.

Figure 5:
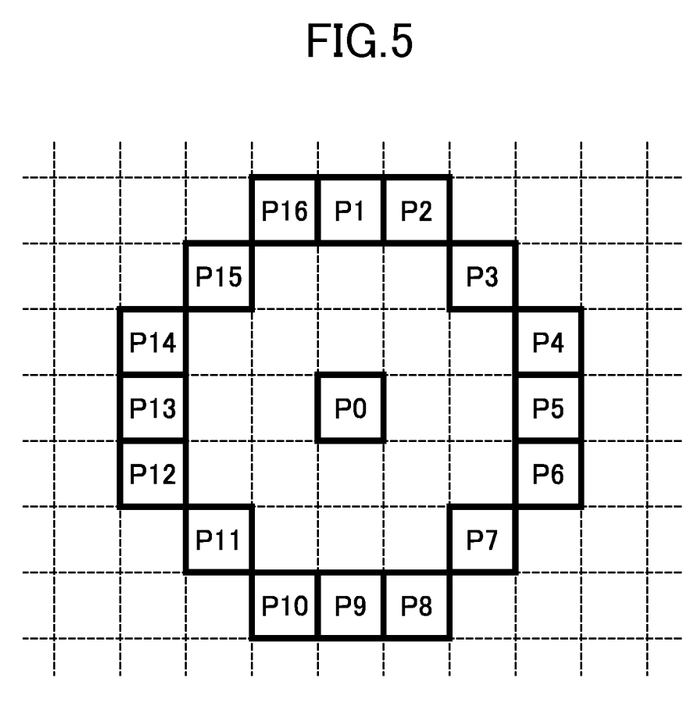
FIG. 5 A diagram explaining processing for determining whether or not a pixel corresponds to a corner.

If the processing target image is a color image, the control unit 11 converts the processing target image into a gray scale image. The control unit 11 then determines whether or not each pixel of the processing target image corresponds to a corner. FIG. 5 is a diagram explaining the processing (FAST method) for determining whether or not a pixel corresponds to a corner.

For example, if a pixel P0 shown in FIG. 5 satisfies the conditions described below, the control unit 11 determines that the pixel P0 corresponds to a corner (more specifically, a point inside a corner).

Firstly, the control unit 11 specifies pixels on a circle of a predetermined radius with the pixel P0 as the center. In an example shown in FIG. 5, the pixels P1-P16 correspond to the pixels on the circle. Further, the control unit 11 determines whether or not a difference between the value of the pixel P0 and a value of each of the pixels P1-P16 is a threshold value or more.

When there are a predetermined number or more of continuous pixels each having a value greater than the value of the pixel P0 by the threshold value among the pixels P1-P16, the control unit 11 determines that the pixel P0 corresponds to a corner. Further, when there are a predetermined number or more of continuous pixels each having a value less than the value of the pixel P0 by the threshold value among the pixels P1-P16, the control unit 11 also determines that the pixel P0 corresponds to a corner.

In step S103, the control unit 11 executes the processing using the FAST method, and thereby obtains FAST feature amount of the processing target image. The FAST feature amount includes coordinates of the point corresponding to the corner (more specifically, the point inside the corner) and color information of the point.

Figure 6:
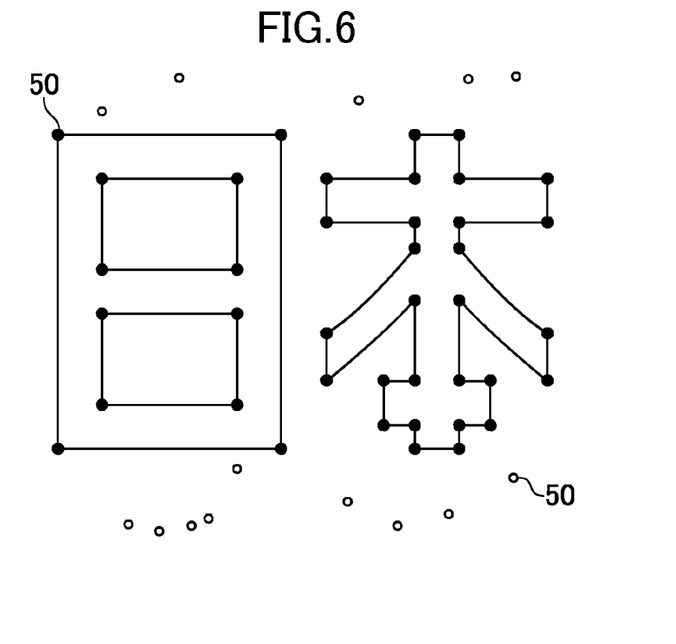
FIG. 6 A diagram illustrating an example of a feature point specified by the image processing device.

FIG. 6 illustrates an example of the feature points specified in step S103 when the item image 30 shown in FIG. 2 is the processing target. The black and white dots shown in FIG. 6 indicate the feature points 50 specified in step S103. FIG. 6 only illustrates the surrounding area of the text 32 in the item image 30.

For example, kanjis include a line extending in the longitudinal direction and a line extending in the lateral direction and they intersect with each other. In FIG. 6, the points at which the lines in the kanjis meaning "Japan" intersect with each other are thus specified as the feature points 50. These feature points 50 in FIG. 6 are shown by black dots.

The item image 30 may also include the points on which the edges extending in different directions intersect in the area where the text 32 (kanjis) are not written. As such, in FIG. 6, the feature points 50 are also specified in the area in which the text 32 (kanjis) are not written. In FIG. 6 these feature points 50 are shown in white dots.

After step S103 is executed, the control unit 11 (area obtaining unit 42 and first obtaining unit 42A) obtains a super corner (S104). Here, "super corner" refers to an area including a plurality of feature points 50 that are aligned in a substantially straight line and have the same or similar colors.

As described above, the text 32 written in the item image 30 usually has a single color, and aligned in a longitudinal or lateral direction. As such, the feature points 50 included in the character area generally have the features as follows:
(1) the feature points 50 are aligned in straight lines extending in longitudinal or lateral directions orthogonal to each other.
(2) the feature points 50 aligned in one straight line have the same or similar colors.

In view of the above features, in step S104, a feature point group satisfying all of the following conditions (A) to (D) is specified, and a rectangular area including the feature point group is obtained as a super corner.
(A) a plurality of feature points 50 are aligned in a substantially straight line in a longitudinal, lateral, or oblique direction.
(B) the plurality of feature points 50 have the same or similar colors.
(C) a distance between the adjacent feature points 50 is equal to or less than a first threshold value.
(D) a distance between the feature point 50 on one end and the feature point 50 on the other end is equal to or greater than a second threshold value (threshold value greater than first threshold value).

Regarding the condition (A), for example, when a distance from the straight line to each of a plurality of feature points 50 (i.e., a length of a perpendicular line dropped from each of a plurality of feature points 50 to the straight line) is equal to or less than the threshold value (e.g., several dots), the control unit 11 regards these feature points 50 as aligned in a substantially straight line.

Regarding the condition (B), for example, when the colors of a plurality of feature points 50 belong to the same color group, which is one of the predetermined N number (e.g., 32) of color groups, the control unit 11 regards these feature points 50 as having the same or similar colors.

The condition (C) is made in order to separate the feature points 50 included in the character area from the feature points 50 included in the area other than the character area as much as possible.

Figure 7:
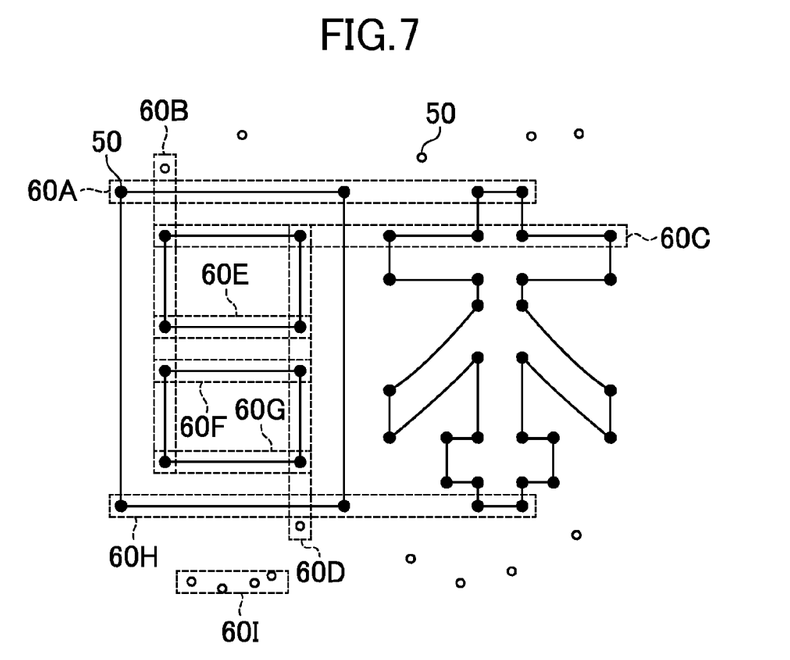
FIG. 7 A diagram illustrating an example of a super corner obtained by the image processing device.

FIG. 7 illustrates an example of the super corner obtained in step S104. In the example of FIG. 7, the super corners 60A-60I are obtained. For simplicity, FIG. 7 illustrates apart of the super corners obtained in step S104, but actually the super corner 60 other than the super corners 60A-60I is also obtained. In the following description, the super corners 60A-60I etc. may collectively be referred to as "super corner 60."

After step S104 is executed, the control unit 11 (extracting means) extracts a super corner 60 included in the character area from the super corners 60 obtained in step S104 (S105).

For example, in the example shown in FIG. 7, the super corners 60A-60H that are included in the character area and the super corner 60I that is not included in the character area are obtained. In step S105, the processing is executed for extracting the super corners 60A-60H, which are included in the character area, from the super corners 60A-60I.

For example, in the image processing device 10, a known graph cut method is applied in order to extract the super corners 60 included in the character area from the super corners 60 obtained in step S104.

The graph cut method is a known method usually used for separating a foreground and a background of an image, and for example, used for specifying an object area in an image. In step S105, the graph cut method is used in a manner in which the character area is considered as a foreground and other area is considered as a background, in order to extract the super corners 60 included in the character area. Typically, the graph cut method defines a surface (area) called "super pixel" to use, but in step S105 the super corner 60 are used instead of "super pixel."

Figure 8:
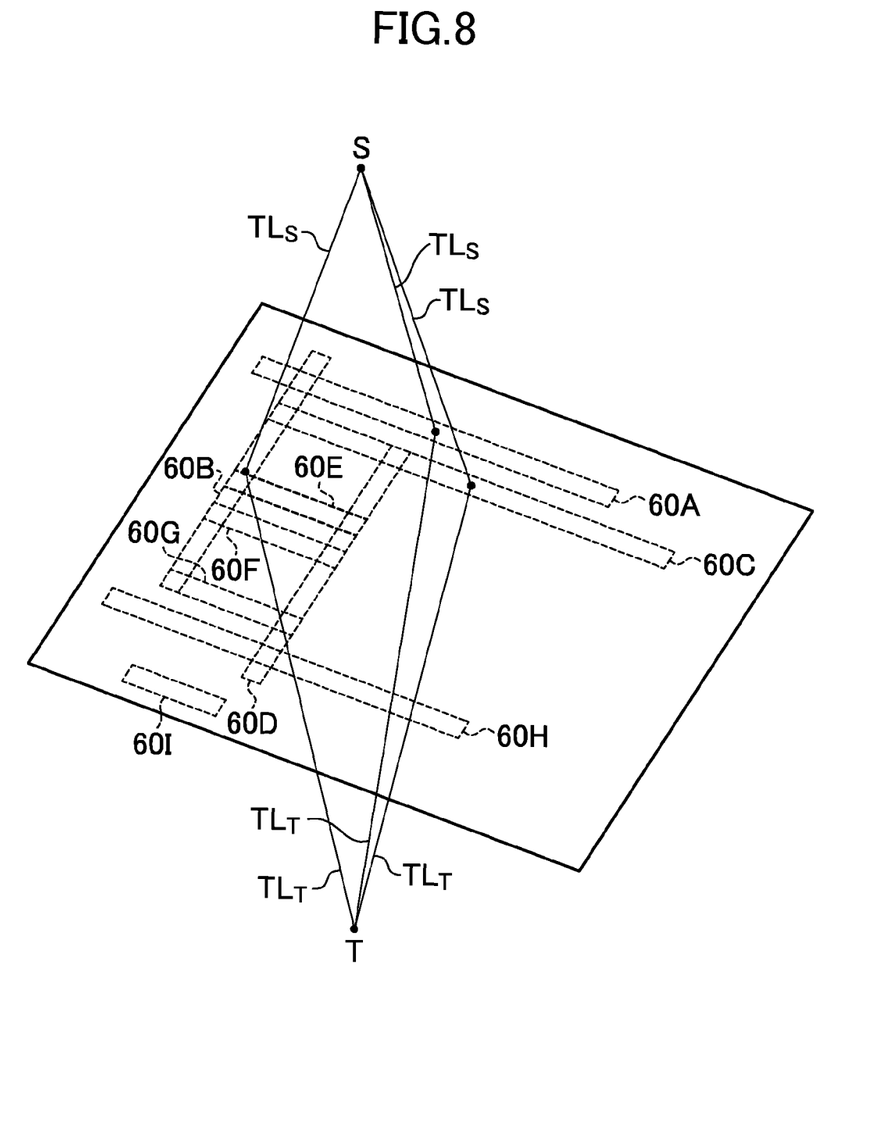
FIG. 8 A diagram explaining a graph cut method.

FIG. 8 is a diagram illustrating an application of the graph cut method. As shown in FIG. 8, a terminal S corresponding to Source and a terminal T corresponding to Sink are set in the graph cut method. In addition, each super corner 60 is set as a node.

Further, edges $TL_S$ are set between the terminal S and respective nodes (super corners 60), and edges $TL_T$ are set between the terminal T and respective nodes (super corners 60). For simplicity, FIG. 8 only shows the edges $TL_S$ between the terminal S and the super corners 60A, 60B, and 60C, and the edges $TL_T$ between the terminal T and the super corners 60A, 60B, and 60C, and other edges $TL_S$ and $TL_T$ are omitted.

In step S105, the super corner 60 that has more amount of energy on the edge $TL_T$ side than on the edge $TL_S$ side is extracted as the super corner 60 included in the character area.

Energy functions are defined as the following equations (1)-(3).

[equation 1]

$$E(L) = \lambda R(L) + B(L) \quad (1)$$

$$R(L) = \sum_{p \in V} \hat{R}(l_p) \quad (2)$$

$\hat{R}(l_p)$: function that has a smaller value when the probability that feature point $p$ is label $l_p$ is higher $$B(L) = \sum_{s_i \in S} \hat{B}(s_i) \quad (3)$$

$s_i$: $i$-th group of feature points aligned in substantially straight line $S$: group of $s_i$ Further, cost $C_S$ regarding the edge $TL_S$ is set as the following equation (4), and cost $C_T$ regarding each edge $TL_T$ is set as the following equation (5).

[equation 2]

$$C_S = \lambda \hat{R}(\text{``bkg''}) \quad (4)$$

$$C_T = \lambda \hat{R}(\text{``text''}) \quad (5)$$

As described in the equation (2), the function shown in the equation (4) is a function that a value of the function decreases as the probability that the super corner 60 (i.e., feature point 50 included in super corner 60) is included in the background area (area other than character area) increases. As such, a value of the cost $C_S$ decreases when the super corner 60 is included in the background area.

Similarly, the function shown in the equation (5) is a function that a value of the function decreases as the probability that the super corner 60 (i.e., feature point 50 included in super corner 60) is included in the character area increases. As such, a value of the cost $C_T$ decreases when the super corner 60 is included in the character area.

Typically, density of the feature points 50 is more increased at the character area than the background area, and thus the number of the feature points 50 included in the super corner 60 in the character area tends to exceed the number of the feature points 50 included in the super corner 60 in the background area. Further, the length of the super corner 60 included in the character area tends to be longer than the length of the super corner 60 included in the background area. As such, when a super corner 60 includes more number of the feature points 50, it is highly likely that the super corner 60 is included in the character area. In addition, when the length of a super corner 60 is longer, it is highly likely that the super corner 60 is included in the character area. As such, the equations (4) and (5) are set such that the cost $C_S$ increases and the cost $C_T$ decreases when the number of the feature points 50 included in the super corner 60 increases. Further, the equations (4) and (5) are set such that when the length of the super corner 60 is longer, the cost $C_S$ increases and the cost $C_T$ decreases.

Although omitted in FIG. 8, an edge NL is set between the nodes (super corner 60). The cost $C_N$ regarding the edge NL between the node $s_i$ (super corner 60) and the node $s_j$ (super corner 60) is defined as equations (6)-(9) described below.

[equation 3]

$$C_N = C_A + C_B + C_C \quad (6)$$

$$C_A = \exp\left(-\frac{eval(s_i, s_j)}{2\sigma_{ang}^2}\right) \quad (7)$$

$$C_B = \exp\left(-\frac{orth(s_i, s_j)}{2\sigma_{orth}^2}\right) \quad (8)$$

$$C_C = \exp\left(-\frac{cdist(s_i, s_j)}{2\sigma_{color}^2}\right) \quad (9)$$

As indicated in the equation (6), the cost $C_N$ is the sum of the cost $C_A$ indicated by the equation (7), the cost $C_B$ indicated by the equation (8), and the cost $C_C$ indicated by the equation (9).

As discussed above, the text 32 written in the item image 30 usually has a single color, and aligned in a longitudinal or lateral direction. Thus, as shown in the super corners 60A-60H in FIG. 7, the super corners 60 included in the character area are typically arranged substantially parallel and close to each other. Alternatively, the super corners 60 included in the character area tend to intersect. In addition, the super corners 60 included in the character area tend to have the same or similar colors.

As such, the equations (6)-(9) are set such that the cost $C_N$ decreases when two super corners 60 (nodes $s_i$ and $s_j$) are substantially parallel and close to each other. Further, the equations (6)-(9) are set such that the cost $C_N$ decreases when the two super corners 60 (nodes $s_i$ and $s_j$) intersect. Similarly, the equations (6)-(9) are set such that the cost $C_N$ decreases when the two super corners 60 (nodes $s_i$ and $s_j$) have the same or similar colors.

For example, the function eval ($s_i$, $s_j$) indicated in the equation (7) is a function that a value of the function eval decreases as the two super corners 60 (nodes $s_i$ and $s_j$) are nearly parallel to each other or the angle between the two super corners (nodes $s_i$ and $s_j$) is closer to 90 degrees. As such, the cost $C_A$ indicated in the equation (7) decreases when the two super corners 60 (nodes $s_i$ and $s_j$) are more parallel and closer to each other.

The equation (7) denotes Gaussian distribution (probability distribution), and the denominator in the equation (7) denotes the variance. When a value of the variance increases, the tail of the Gaussian distribution spreads wider, and when the value of the variance decreases, the Gaussian distribution has a sharper peak. The value is determined by an experiment performed in advance. For example, when a peak is set to be sharp, the probability that a plurality of Gaussian distributions intersect decreases. As a result, the super corners 60 close to each other are likely to be separated. On the other hand, when the tail of the Gaussian distribution spreads wider, the probability that a plurality of Gaussian distributions intersect increases. As a result, the super corners 60 close to each other are unlikely to be separated.

The function orth ($s_i$, $s_j$) indicated in the equation (8) is a function denoting an orthogonal relationship between the two super corners 60 (nodes $s_i$ and $s_j$) and is a function that a value of the function orth decreases when the two super corners 60 (nodes $s_i$ and $s_j$) are orthogonal to each other. As such, the cost $C_B$ denoted by the equation (8) decreases as the two super corners 60 (nodes $s_i$ and $s_j$) are orthogonal to each other. Similarly to the equation (7), the equation (8) denotes Gaussian distribution (probability distribution), and the denominator in the equation (8) denotes the variance.

Even when the angle between the two super corners 60 is 90 degrees, if the two super corners 60 do not actually intersect, it is not determined that the two super corners 60 are orthogonal to each other. For example, in an example shown in FIG. 7, the super corners 60A and 60B actually intersect, and thus it is determined that the super corners 60A and 60B are orthogonal to each other. On the other hand, the angle formed between the super corners 60A and 60D is substantially 90 degrees but the super corners 60A and 60D do not actually intersect, and thus it is determined that the super corners 60A and 60D are not orthogonal to each other.

The function cdist ($s_i$, $s_j$) indicated in the equation (9) is a function denoting a difference in colors between the two super corners 60 (nodes $s_i$ and $s_j$), and is a function that a value of the function cdist decreases when the difference in colors is smaller. As such, when the difference in colors of between the two super corners 60 (nodes $s_i$ and $s_j$) is smaller, the cost $C_C$ denoted by the equation (9) decreases. In other words, when the color groups to which the two super corner 60 (nodes $s_i$ and $s_j$) belong is the same group, the cost $C_C$ denoted by the equation (9) decreases. Similarly to the equation (7), the equation (9) denotes Gaussian distribution (probability distribution), and the denominator in the equation (9) denotes the variance.

The graph cut method determines how to classify nodes (super corners 60) into a character area or a background area in order to minimize the sum of the above described costs $C_S$, $C_T$, and $C_N$.

That is, in step S105, the nodes (super corners 60) are classified into the character area or the background area such that the sum of the costs $C_S$, $C_T$, and $C_N$ is minimized, and thereby the super corners 60 included in the character area are extracted.

After step S105 is executed, the control unit 11 combines the super corners 60 extracted in step S105 under the predetermined condition (S106).

For example, the control unit 11 combines the super corners 60 that are arranged close and substantially parallel to each other among those extracted in step S105. That is, if a distance between the super corners 60 substantially parallel to is less than a reference distance, the control unit 11 combines such super corners 60. Further, for example, the control unit 11 combines the super corners 60 that intersect each other among those extracted in step S105.

In this case, even when the color group of the feature points 50 included in one super corner 60 is different from the color group of the feature points 50 included in the other super corner 60, in other words, even when the color of the feature points 50 included in one super corner 60 is neither the same as nor similar to the color of the feature points 50 included in the other super corner 60, the control unit 11 combines such two super corners 60.

When combining a plurality of super corners 60, the control unit 11 generates a rectangular area including such super corners 60 as a combined area that is obtained by combining the super corners 60.

Here, assume that super corners 60A-60H shown in FIG. 7 are extracted as the super corners 60 included in the character area in step S105.

In this case, the super corners 60A and 60C are close and substantially parallel to each other, and thus the control unit 11 combines the super corners 60A and 60C. Similarly, the super corners 60E and 60F are close and substantially parallel to each other, and thus the control unit 11 combines the super corners 60E and 60F. Further, the super corners 60G and 60H are close and substantially parallel to each other, and thus the control unit 11 combines the super corners 60G and 60H.

The super corner 60B intersects with the super corners 60A, 60C, 60E, 60F, and 60G, and thus the control unit 11 combines the super corner 60B with the super corners 60A, 60C, 60E, 60F, and 60G. Similarly, the super corner 60D intersects with the super corners 60C, 60E, 60F, 60G, and 60H, and thus the control unit 11 combines the super corner 60D with the super corners 60C, 60E, 60F, 60G, and 60H.

Figure 9:
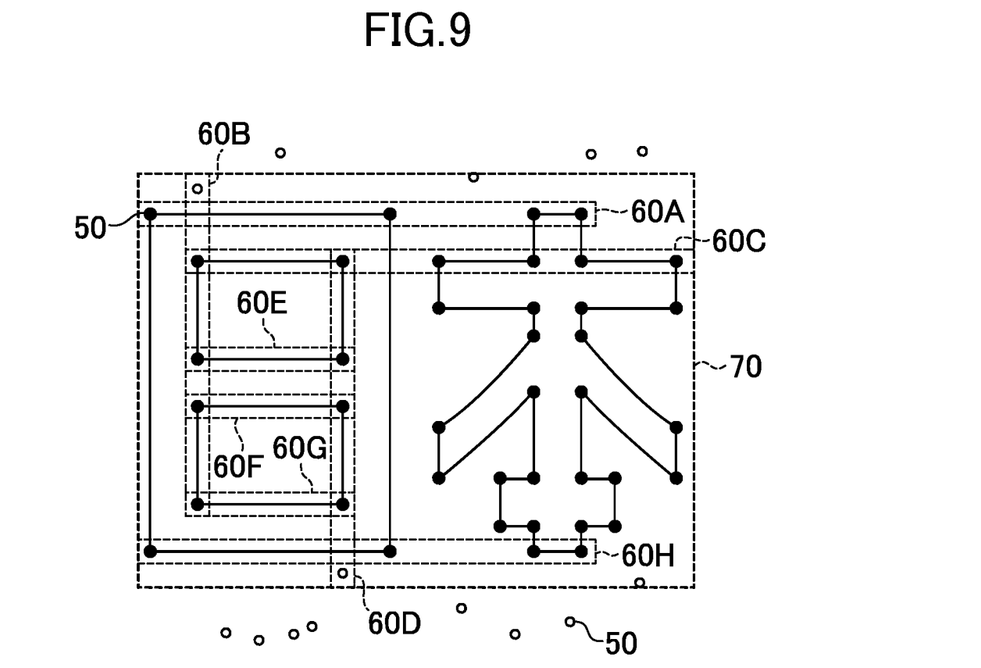
FIG. 9 A diagram explaining combining super corners.

In the case described above, the control unit 11 combines the super corners 60A-60H. That is, as shown in FIG. 9, the control unit 11 obtains a rectangular area including the super corners 60A-60H as a combined area 70 that is obtained by combining the super corners 60A-60H.

In a case where the combined area 70 is obtained by combining a plurality of super corners 60, the number of the combined super corners 60 is stored in association with the combined area 70. The number is used in step S111 described later.

If each length of a longitudinal side and a lateral side of the combined area 70 generated by combining a plurality of super corners 60 is less than a first threshold value (e.g., 20 pixels), the plurality of super corners 60 may not be combined.

Typically, a character area (area in which text is written) is a laterally long or longitudinally long area. In this regard, if a length of the longitudinal side and a length of the lateral side of the combined area 70 are short, it is highly likely that the combined area 70 does not correspond to a character area. As such, with the above-described manner, a combined area 70 that unlikely corresponds to a character area can be ignored, thereby accuracy of specifying the character area can be improved.

Further, if each length of a longitudinal side and a lateral side of the combined area 70 generated by combining a plurality of super corners 60 is greater than a first threshold value (e.g., 20 pixels) and less than a second threshold value (a threshold value greater than a first threshold value: e.g., 30 pixels), and a distance between the combined area 70 and the closest other super corner 60 is equal to or greater than a threshold value, the plurality of super corners 60 may not also be combined.

Although a combined area 70 is not so large, if the other super corner 60 is located near the combined area 70 (super corners 60), another combined area 70 generated by combining the combined area 70 and the other super corner 60 may correspond to the character area. On the other hand, if the other super corner 60 is not located near a combined area 70, such combined area 70 unlikely corresponds to the character area. As such, with the above mentioned manner, the combined area 70 that unlikely corresponds to a character area can be ignored, thereby accuracy of specifying the character area can be improved.

After step S106 is executed, the control unit 11 multiplies a variable x by 0.5 (S107) to obtain a reduced image, which is obtained by reducing the original image by x % (S108). In step S107, a value multiplied by the variable x is not limited to 0.5, but may be another value greater than 0 and less than 1.

After step S108 is executed, the control unit 11 determines whether or not a length of at least one of the longitudinal side and the lateral side of the reduced image obtained in step S108 is equal to or less than a threshold value (e.g., 64 pixels) (S109). If both of the longitudinal side and the lateral side of the reduced image are not equal to and less than the threshold value (S109:N), the control unit 11 sets the reduced image obtained in step S108 as a processing target (S110). Subsequently, the control unit 11 (second specifying unit 40B and second obtaining unit 42B) executes steps S103-S109. In this case, the reduced image is set as the processing target, and the feature points 50 and the super corners 60 are specified and the combined area 70 is obtained therefrom.

Figure 10A:
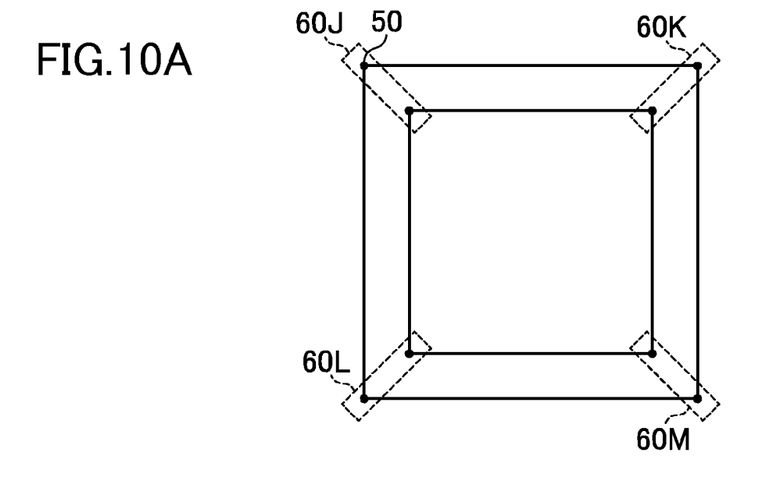
FIG. 10A A diagram explaining meaning of specifying a super corner in a reduced image.
Figure 10B:
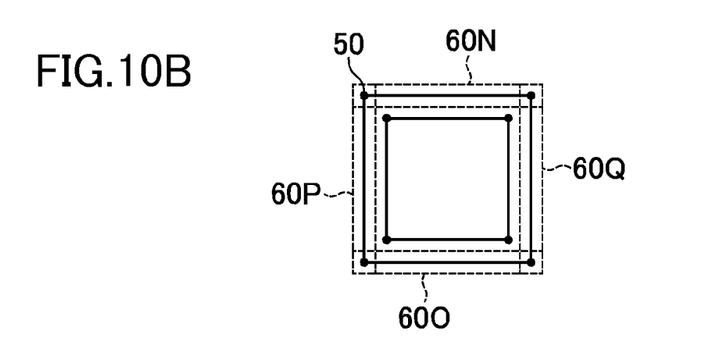
FIG. 10B A diagram explaining meaning of specifying a super corner in a reduced image.
Figure 10C:
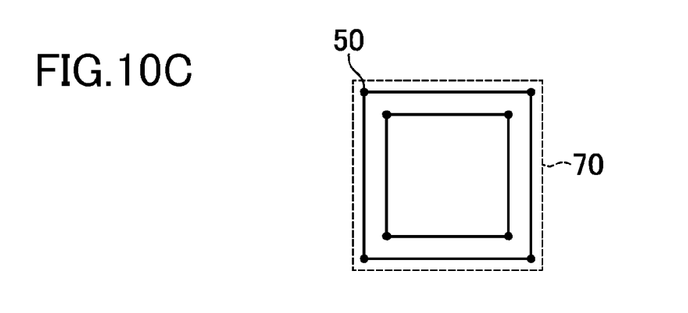
FIG. 10C A diagram explaining meaning of specifying a super corner in a reduced image.

The following describes the meaning of setting a reduced image as a processing target to execute steps S103-S106. FIGS. 10A, 10B and 10C are diagrams for explaining the meaning. Here, a case is assumed where a kanji meaning "mouth" as shown in FIG. 10(A) is written in an item image 30. FIGS. 10A-10C only illustrate areas around the section in which the kanji meaning "mouth" is written.

In this case, in the item image 30 that is not reduced, the feature points 50 (first feature points) as shown in FIG. 10A are specified in step S103. Subsequently, the super corners 60J, 60K, 60L, and 60M are obtained in step S104. However, in this case, even when the super corners 60J-60M are extracted in step S105 as the super corners 60 included in the character area, the super corners 60J-60M are not close to one another and do not intersect, and thus the super corners 60J-60M are not combined. As a result, the character area is not fully specified in this way.

On the other hand, in the reduced item image 30 as shown in FIG. 10B, the feature points 50 (second feature points) as shown in FIG. 10B are specified in step S103. Subsequently, the super corners 60N, 60O, 60P, and 60Q are obtained in step S104. In actuality, other super corners 60 than the super corners 60N-60Q are also obtained, but omitted in FIG. 10B for simplicity.

In step S105, when the super corners 60N-60Q are extracted as the super corners 60 included in the character area, the super corners 60N and 60O intersect with the super corners 60P and 60Q, and thus the super corners 60N-60Q are combined in step S106. That is, as shown in FIG. 10C, the combined area 70 is generated by combining the super corners 60N-60Q.

The super corners 60 that are close to or intersect each other may not possibly be specified when a size of the characters written in the image (item image 30) is large. This problem can also be solved by specifying the super corners 60 in the reduced image, which is obtained by reducing an image.

As discussed above, the image processing device 10 also specifies a super corner 60 in a reduced image, which is obtained by reducing an original image, in view of a case where a super corner 60 is not fully specified from an image of original size depending on a type or a size of the character written in the image (item image 30).

The steps S103-S108 are repeated until the length of at least one of the longitudinal side and the lateral side of the reduced image becomes equal to or less than the threshold value. The case where "the length of at least one of the longitudinal side and the lateral side of the reduced image becomes equal to or less than the threshold value" is a case where the reduced image is considerably reduced. If the processing target image is reduced to a size that is too small, it adversely affects, for example, the specification of the feature points 50 or the super corners 60. As such, the image processing device 10 is configured not to execute steps S103-S108 when the length of at least one of the longitudinal side and the lateral side of the reduced image is equal to or less than the threshold value.

If the length of at least one of the longitudinal side and the lateral side of the reduced image becomes equal to or less than the threshold value (S109:Y), the control unit 11 specifies the character area by integrating the combined area 70 obtained in the image of original size (original image) and the combined area 70 obtained in the reduced image (S111).

Figure 11:
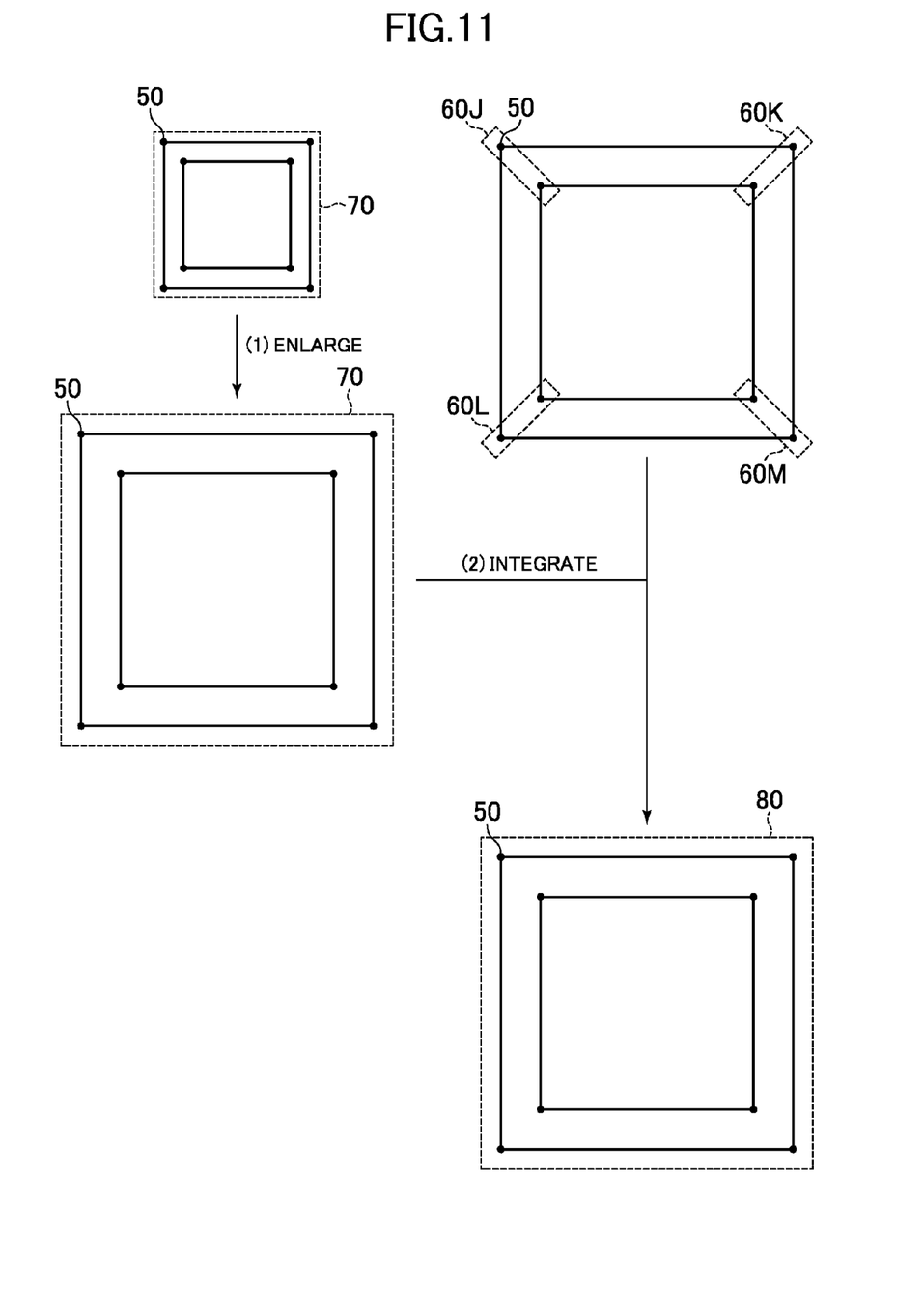
FIG. 11 A diagram explaining integrating combined areas.

FIG. 11 is a diagram for explaining integration of the combined area 70. FIG. 11 assumes a case shown in FIGS. 10A-10C. That is, FIG. 11 assumes a case where, for example, the super corners 60J-60M as shown in FIG. 10A are obtained in the image of original size, and the combined area 70 as shown in FIG. 10C is obtained in the reduced image.

In this case, the control unit 11 enlarges the combined area 70 obtained in the reduced image according to the size ratio of the reduced image to the image of original size. That is, the control unit 11 enlarges the combined area 70 obtained in the reduced image using an enlargement ratio for returning the reduced image to the image of original size. In other words, the control unit 11 obtains the combined area 70 in a case where the reduced image is enlarged to the original size. For example, when the reduced image is obtained by reducing the image to 50 percent of its original size, the control unit 11 obtains the combined area 70 in a case where the reduced image is enlarged two times.

Subsequently, the control unit 11 obtains the character area by integrating the combined area 70 obtained in the image of original size and an area obtained by enlarging the combined area 70 obtained in the reduced image. That is, the control unit 11 obtains a rectangular area that includes the combined area 70 obtained in the image of original size and the area obtained by enlarging the combined area 70 obtained in the reduced image. The control unit 11 regards the rectangular area as a character area 80.

In the case shown in FIG. 11, the combined area 70 is not obtained in the image of original size, and thus the control unit 11 regards the area obtained by enlarging the combined area 70 obtained in the reduced image as the character area 80.

If one or more characters are written in an image, there should be some number of super corners 60 as shown in FIG. 7, for example. As such, if the number of super corners 60 obtained in an image (image of original size or reduced image) is equal to or less than a predetermined number (e.g., two), such image may be regarded as having no character area. In this way, accuracy of specifying the character area can be improved.

If a combined area 70 corresponds to a character area, such combined area 70 should include some number of super corners 60. As such, if a combined area 70 obtained in an image (image of original size or reduced image) is made by combining less than a predetermined number of super corners 60, such combined area 70 may not be integrated with other combined areas 70 in step S111. In other words, such combined area 70 may not be regarded as a portion of a character area. In this way, accuracy of specifying the character area can be improved.

When a combined area 70 of an image (e.g., an image of original size) and a combined area 70 of another image (e.g., a reduced image) are integrated and a size of a common area of these combined areas 70 is equal to or less than a predetermined ratio of a size of an area obtained by integrating these combined areas 70, these combined areas 70 may not be integrated. For example, when one end of a combined area 70 extending in a longitudinal direction intersects with one end of a combined area 70 extending in a lateral direction, if these combined areas 70 are integrated, the area mostly including areas other than the combined areas 70 is regarded as a character area 80. It is not appropriate to regard such area as a character area 80. With the above-described manner, such area is not regarded as a character area 80, thereby accuracy of specifying the character area can be improved. The similar manner may be applied to a case where the super corners 60 are combined.

The image processing device 10 described above specifies a corner of an edge (variable-density edge) in an image as a feature point 50. The image processing device 10 specifies a character area in the image based on the feature point 50 in view of a tendency of the feature point 50 (corner of edge) included in the character area. As a result, according to the image processing device 10 of this embodiment, even when a variable-density difference in an area other than the character area in the image is large, the character area included in the image can be specified.

Further, the image processing device 10 according to this embodiment does not specify a character area when the image does not include a character, even when a variable-density difference is large. That is, when the image does not include a character, the image processing device 10 determines that the image does not include a character even when a variable-density difference is large. In other words, the image processing device 10 can be used in order to determine that an image does not include a character area (the image processing device 10 can be used in a case where whether or not a character area is included in an image is determined).

As a method for specifying a character area in an image, a method for specifying edges (variable-density edges) in the image and specifying the character area based on the edges may be also used. However, the image processing device 10 specifies a character area by specifying only edge portion (corner of edge) required for specifying the character area, and thereby enabling to reduce an overall processing load compared to specifying all edges in the image.

As shown in FIG. 6, in a case where lines constituting a character form a corner, two feature points 50 inside and outside the corner are obtained. If the character is bordered, a feature point 50 is also obtained for the border. In this way, enough number of feature points 50 for specifying a character area can be obtained without using all of edge portions (variable-density edges) in the image.

The image processing device 10 applies a graph cut method so that a super corner 60 included in the character area can be extracted from the super corners 60 obtained from the image.

Further, the image processing device 10 also obtains a super corner 60 from a reduced image. This results in improving accuracy of specifying the character area.

When the FAST method is used, a feature point 50 inside a corner of lines constituting a character has a background color, and an outside feature point 50 has a character color. When a plurality of super corners 60 are substantially parallel and close to one another, or intersect, the image processing device 10 combines these super corners 60 even when the colors of the feature points 50 included in the super corners 60 are neither the same nor similar. As a result, according to the image processing device 10, it is possible to specify all of the character areas.

The present invention is not to be limited to the above described embodiment.

For example, in the above, the case is explained where a kanji is written in an image (see FIG. 2), although the present invention is applicable to a case where a character other than kanji is written in the image. For example, the present invention is also applicable to a case where hiragana or katakana is written in an image. In addition, the present invention is also applicable to a case where characters corresponding to language other than Japanese, such as Alphabet, simplified/traditional Chinese, and Hangeul characters, are written in an image.

Further, for example, the present invention is also applicable to a case where a character area is specified in an image other than an item image 30.

The invention claimed is:

1. An image processing device comprising:
   a processor; and
   a memory device that stores a plurality of instructions, which when executed by the processor, cause the processor to:
   specify corners of edges in a target image as feature points;
   determine whether or not a plurality of first feature points that are among the specified feature points and are aligned in a substantially straight line have a same or similar color in order to specify, among the specified feature points, the plurality of first feature points that are aligned in a substantially straight line and have a same or similar color, and obtain, in a case where it is determined that the first plurality of feature points that are aligned in the substantially straight line have the same or similar color, an area including the plurality of first feature points; and
   specify a character area in the target image based on the obtained area.

2. The image processing device according to claim 1, wherein the processor specifies sets of the plurality of first feature points that are aligned in a substantially straight line and have a same or similar color,
   the processor obtains areas each including a corresponding one of the specified sets of the plurality of first feature points that are aligned in a substantially straight line and have a same or similar color, and
   the processor specifies the character area based on areas that are close to each other among obtained areas.

3. The image processing device according to claim 1,
   wherein the processor specifies sets of the plurality of first feature points that are aligned in a substantially straight line and have a same or similar color,
   the processor obtains areas each including a corresponding one of the specified sets of the plurality of first feature points that are aligned in a substantially straight line and have a same or similar color,
   the processor specifies the character area by combining areas that are close to each other among obtained areas, and
   wherein, in a case where a first area and a second area are obtained and are close to each other, the processor specifies the character area by combining the first area and the second area even when a color of a feature point included in the first area is neither a same as nor similar to a color of a feature point included in the second area.

4. The image processing device according to claim 1,
   wherein the processor specifies corners of edges in the target image as third feature points,
   the processor determines, based on a specified result from the target image, whether or not the plurality of first feature points that are among the specified third feature points and are aligned in a substantially straight line have a same or similar color, and obtain, in the case where it is determined that the plurality of first feature points that are aligned in the substantially straight line have the same or similar color, an area including the plurality of first feature points,
   the processor specifies corners of edges in a reduced image, which is obtained by reducing the target image, as fourth feature points,
   the processor determines, based on a specified result from the reduced image, whether or not a plurality of second feature points that are among the specified fourth feature points and are aligned in a substantially straight line have a same or similar color, and obtain, in the case where it is determined that the plurality of second feature points that are aligned in the substantially straight line have the same or similar color, an area including the plurality of second feature points, and
   the processor specifies the character area in the target image based on the obtained area including the plurality of first feature points and the obtained area including the plurality of second feature points.

5. The image processing device according to claim 1,
   wherein the processor specifies sets of the plurality of first feature points that are aligned in a substantially straight line and have a same or similar color,
   the processor obtains areas each including a corresponding one of the specified sets of the plurality of first feature points that are aligned in a substantially straight line and have a same or similar color,
   the processor extracts, using a graph cut method, an area included in the character area among obtained areas, and
   the processor specifies the character area in the target image based on the extracted area.

6. A image processing method comprising:
   specifying, with a processor, corners of edges in a target image as feature points;

determining, with the processor, whether or not a plurality of feature points that are aligned in a substantially straight line have a same or similar color in order to specify, among the specified feature points, the plurality of first feature points that are aligned in a substantially straight line and have a same or similar color, and obtaining, with the processor, in a case where it is determined that the plurality of first feature points that are aligned in the substantially straight line have the same or similar color, an area including the specified plurality of first feature points; and specifying, with the processor, a character area in the target image based on the obtained area.

* * * * *